United States Patent [19]

Rajsigl et al.

[11] Patent Number: 4,513,566
[45] Date of Patent: Apr. 30, 1985

[54] RESILIENT SUPPORT FOR A HIGH-SPEED ROTOR

[75] Inventors: Zdenek Rajsigl, Brno; Milos Mladek; Michal Blasko, both of Usti n/Orl.; Josef Smatana, Bytca, all of Czechoslovakia

[73] Assignee: ZVL Vyzkumny ustav pro valiva loziska Brno koncernova ucelova organizace, Brno, Czechoslovakia

[21] Appl. No.: 499,177

[22] Filed: May 31, 1983

[30] Foreign Application Priority Data

May 31, 1982 [CS] Czechoslovakia ............ 3984-82

[51] Int. Cl.³ ............................................ D01H 7/882
[52] U.S. Cl. .................................... 57/406; 57/77; 384/227; 494/82; 494/83
[58] Field of Search ............ 57/404, 76, 406, 77, 57/92, 407, 100, 104, 105; 494/46, 82, 83; 384/227, 228, 239

[56] References Cited

U.S. PATENT DOCUMENTS

| 3,595,002 | 7/1971 | Korityssky et al. | 57/406 |
| 3,972,171 | 8/1976 | Handschuch et al. | 57/406 |
| 3,972,172 | 8/1976 | Waleckx | 57/406 |

Primary Examiner—John Petrakes

[57] ABSTRACT

Resilient high-speed rotor support, especially applicable to rotor shafts in open-end spinning machines. The support is made up of a double-row rolling bearing, a rotor shaft, and a central sleeve for the bearing, as well as resilient damping elements disposed at the ends of the central sleeve and fixed within the housing of the spinning mechanism. At the stepped ends of the central sleeve there are fixed resilient damping elements by means of their radially inner annular parts, the external circumference of the damping elements, reduced by the height of the limiting gap between them and the housing, extends to the circumference of marginal orifices within the housing. The bore at the rotor end of the central sleeve is formed with a tolerance to provide a running fit with the rotor hub. The support of the invention is applicable especially in spinning machines operating with rotor speeds exceeding 60,000 RPM.

3 Claims, 1 Drawing Figure

U.S. Patent   Apr. 30, 1985   4,513,566
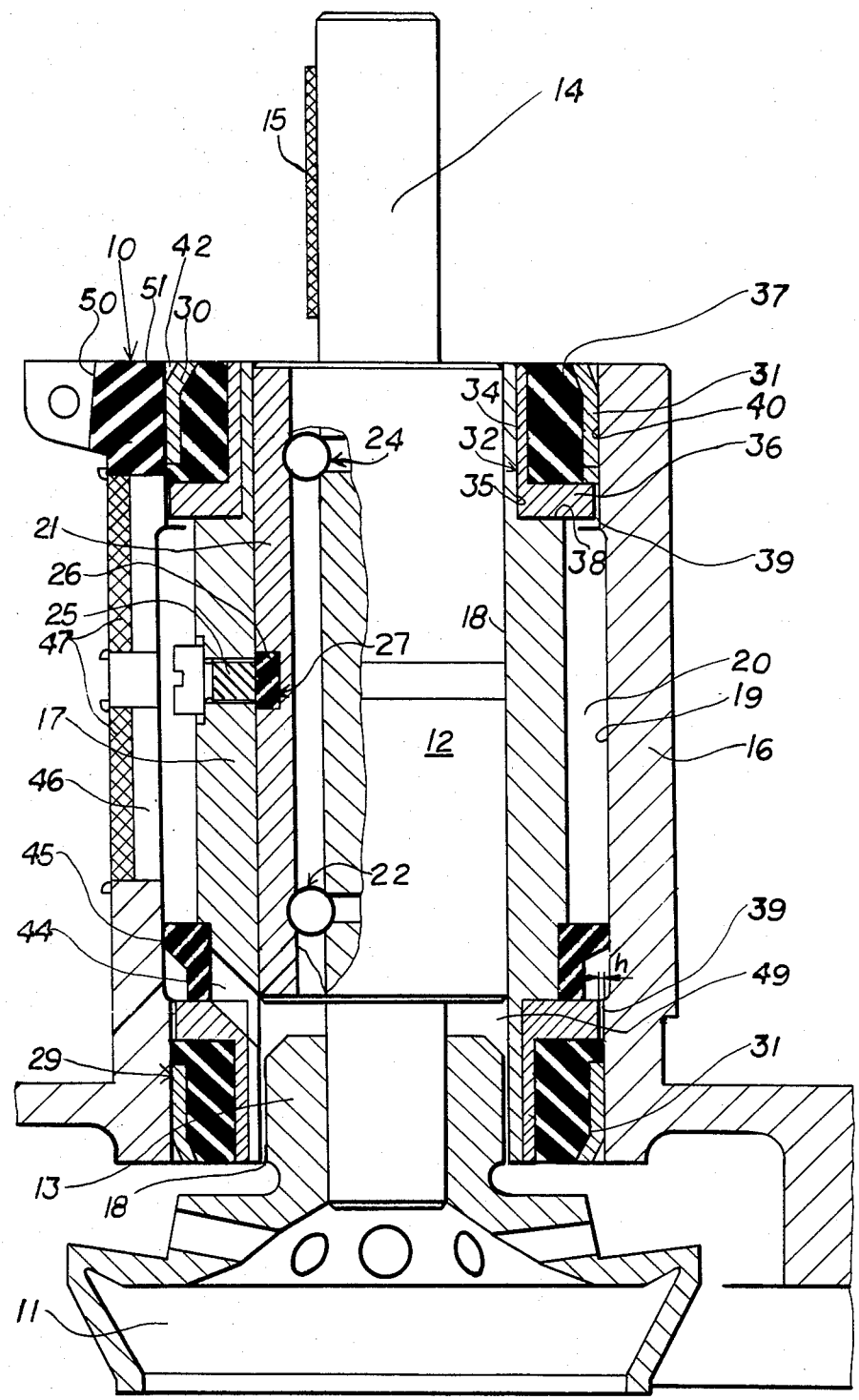

RESILIENT SUPPORT FOR A HIGH-SPEED ROTOR

This invention relates to a resilient support for a high-speed rotor, especially for supporting the bearings which mount the rotor in an open-end spinning machine.

To insure a satisfactory life of rotor bearings, damping elements of different shapes are used to enable the bearings to operate in spite of the adverse action of rotor imbalance. In new generation spinning machines with rotor speeds ranging from 60,000 to 80,000 RPM, a perfect design of the damping elements is of paramount importance. Rotor supports hitherto known seldom need all the requirements for a resiliently damped support which is necessary for smooth performance, especially as to the connection of the bearings to the rotor within the housing of the spinning mechanism, the removal of heat from the spinning machine, the easy mounting and dismantling of the machine, and the limitation of the radial displacement of the rotor to prevent contact between the rotor and the cover of the housing. It is no less important also to establish a perfect relubrication of the bearings, and the maximum possible reduction of air-flow through the bearing system, since such air-flow causes an undesirable aging of the lubricant and a contamination of the races of the bearings.

In the open-end spinning machine art there is predominantly used a double-row ball bearing for supporting the rotor. The outer ring of the bearing is inserted in a sleeve which is located within the cavity of the spinning machine housing by means of resilient elements. These types of supports are successfully utilized in spinning machines operating with speeds up to 60,000 RPM; pressure problems at the ends of the bearings have not as yet been solved. An excessive amount of air flows through air holes in the housing, such air-flow causing the clogging of the internal space within the housing with the fibers of the material being spun, thus adversely affecting the performance of the bearing, and making maintenance of the spinning machine and its attendance fairly difficult.

In some prior constructions, the supporting of the rotor is effected by two independent bearings with a resilient element arranged on the more heavily loaded bearing exhibiting a damping value which is at least double that of the resilient element arranged on the other bearing. But in this construction, airflow through the bearings is not prevented, and also, a potential radial displacement of the rotor is not taken into account, especially with regard to the construction of a less rigid resilient element on the more heavily loaded bearing.

In another prior known design, the rotor shaft is also supported in a pair of bearings, such bearings being located in a thin-walled light metal sleeve supported within the cavity in the housing of the mechanism by means of resilient elements. Arranged between these two elements there are means for the access of air into the space between the sleeve and the internal wall of the housing. This configuration provides for the decrease of the pressure gradient of the air at the bearing end faces, but the radial displacement of the rotor shaft by thrust and centrifugal forces acting upon such shaft is not limited. The requirements of an easy and simple mounting are also not achieved in this apparatus, and the manufacture of such apparatus is rather time-consuming.

In the latest prior art designs with a double-row bearing and resilient supports, with a distance sleeve overhanging the edges of the outer bearing ring and with a double shaft seal, the space outside the faces of the bearing ring is interconnected toward its center, thus permitting the lubricating oil for the bearings to circulate. Air-flow through the bearing is prevented by means of shaft shields and large cross-section ducts connecting the space below the shields with the external atmosphere. This design has the following limitations: a displacement of the center of gravity of the rotor, and expensive manufacture due to the intricate design of such apparatus. Further, in the case of total failure, a mere bearing replacement by using the remaining, intact components of the apparatus is not sufficient.

The shortcomings of the prior art, mentioned above, are overcome to a considerable degree by the use of a resilient support for a high-speed rotor according to the present invention. Such support has a double-row ball bearing, a shaft with an overhanging pressed-on rotor, a central sleeve accomodating the outer bearing ring, and resilient damping elements at the end faces of the central sleeve fixed within the housing of the spinning mechanism. The bore in the central sleeve at the rotor end has at least the same diameter as the outer diameter of the double-row rolling bearing and has a tolerance which permits the rotor hub to fit within the sleeve with a running fit. The resilient damping elements are fixed at the stepped ends of the central sleeve by means of their internal parts provided with shoulders resting against the side walls of a step on the central sleeve; such shoulders have their diameter reduced by the height of the limiting gap between them and the end orifices of the housing of the spinning mechanism.

To the internal parts of the resilient damping elements there are attached, by a curing process, central parts made of rubber; these parts are also attached the same way to external parts of the damping elements. These external parts rest against the walls of marginal orifices of the housing of the spinning mechanism. The internal space of the housing is connected with another space created between the faces of the rotor hub and the double-row rolling bearing by means of orifices passing at an oblique angle with respect to the end of the central sleeve. The air holes within the spinning mechanism housing are provided with perforated shields, and at the margin of the housing, near the drive side of the rotor shaft, there is provided a cut-out in which a resilient insert is located.

A substantial reduction of contaminating particles, and thus a considerable life-extension of the mechanism, has been achieved by the use of the resilient support for a high-speed rotor according to the invention. With resilient damping elements a required amplitude of vibration independent of the sealing-gap dimensions can be realized. The support of the invention allows the raising of the rotor speed to about 60,000 RPM, and the manufacture of the support of the invention is relatively cheap. The attendance of the mechanism, as well as its maintenance during the operation, are fast and simple.

The invention will be more readily understood upon consideration of the accompanying drawing, in which:

The single FIGURE of the drawing is a fragmentary view, partially in axial cross-section and partially in side elevation, of an open-end spinning rotor, the spinning machine housing, and the arrangement for rotatably supporting the rotor and shaft within the machine housing.

The mechanism shown in the drawing constitutes one unit 10 of a multiple-unit open-end spinning machine. Each such unit 10 has a rotor 11 mounted upon and affixed to the forward end of a shaft 12. The rear end 14 of shaft 12 protrudes beyond the rear end of the housing 16 of the unit and is frictionally engaged by a belt 15 which runs along the length of the multiple-unit spinning machine and frictionally engages each projecting portion 14 of the respective spinning units. The rotor 11 has a hub 13 which engages the end of shaft 12 with a force fit.

The housing 16 has a cavity therewithin, in which there is centrally disposed a sleeve 17 extending longitudinally thereof. Sleeve 17 has a central bore 18 therein extending from the forward end to the rear end of it. The sleeve 17 has an outer diameter such that an annular space 20 of substantial radial dimension is presented between the sleeve and the inner surface 19 of the housing. Snugly fitting within the sleeve 17 and disposed coaxial thereof is a sleeve 21 which constitutes the outer race of a forward ball bearing 22 and a rear bearing 24, said two bearings being spaced axially a substantial distance from each other. The sleeve 21 is fixedly mounted within the sleeve 17, so as to be held from both axial and rotational movement with respect thereto by a stud 25 having threaded engagement with the sleeve 17. The radially inner end of stud 25 engages an insert 26 which is disposed in an annular groove 27 in the outer surface of the sleeve 21.

The assembly made up of the outer sleeve 17, the inner sleeve 21, the bearings 22 and 24, the shaft 12 and the rotor 11 are mounted upon and within the housing 16 by a forward resilient damping means 29 and a rear resilient damping means 30, such two damping means being spaced a substantial distance axially from each other. Since damping means 29 and 30 are substantially similar to each other except for the fact that they are reversely positioned in an axial direction, only the rear resilient damping means 30 need be described in detail.

Resilient damping means 30 is made up of a radially outer annular member 31, a radially inner annular member 32, and an intermediate resilient member 37, made of rubber, which is disposed between and bonded to parts 31 and 32. Part 32, which is received within an annular seat 35 in the rear end of sleeve 17, has a radially thin axially extending sleeve-like part 34 and a thicker, transversely extending part 36 integrally attached to the forward end of part 34. The parts 31, 32 and 37 constitute an assembly, the forward end of which engages a transverse shoulder 38 which constitutes the forward end of the annular seat 35 in the sleeve 17. The dimensions of the parts are such that there is presented an annular gap 39 having a radial dimension h between the radially outer surface of part 36 and the bore 40 at the rear and forward ends of the housing 16.

The rear end portion 41 of the radially thin axial part 34 is bent radially inwardly somewhat so as to present an annular end or marginal orifice 42 between such end of part 34 and the rear end of the housing 16. As stated above, the forward resilient damping means 29 has parts which correspond to those of the above-described damping means 30, and means 29 cooperates with the housing in the same manner as the rear resilient damping means 30 with the exception of the reversed positioning of the forward resilient damping means 29 vis-a-vis the rear resilient damping means 30.

In the central sleeve 17, to the rear of the hub 13 of the rotor 11, there are provided additional orifices 44 connecting the space 20 within the housing 16 with another space 49 between the rear face of the hub 13 of the rotor 11 and the forward face of the bearing 22. These additional orifices 44 are covered with screens 45. Air holes 46 within the housing 16 are provided from outside with perforated shields 47. At the rear end of the housing 16, at the driving end thereof there is provided a cut-out 50 in which there is mounted a resilient insert 51. Cut-out 50 serves for clamping the ends of the housing 16 and thus provides a perfect sealing of the internal space therewithin. Between the central sleeve 17 and the housing 16 there is disposed an element made of electrically conductive material for the dissipation of static electricity. The forward resilient damping element 29 is subjected solely to radially acting forces, whereas the rear resilient damping element 30 at the opposite, driving side of the unit, is subjected to radially acting forces, axially acting forces, and torque.

Although the invention is described and illustrated with reference to a single preferred embodiment thereof, it is to be expressly understood that it is in no way limited to the disclosure of such preferred embodiment but is capable of numerous modifications within the scope of the appended claims.

We claim:

1. A resilient support for a high-speed rotor mounted upon a rotor shaft for the spinning mechanism of an open-end spinning machine, said support including a housing for the spinning mechanism, said housing having a generally circular cylindrical passage therethrough, a central sleeve mounted within the passage in the housing coaxial thereof, the rotor shaft being disposed centrally within the central sleeve and coaxial therewith, a double-row rolling bearing for the rotor shaft, said bearing being disposed between the central sleeve and the rotor shaft, the rows of the rolling bearing being spaced substantially from each other along the length of the rotor shaft, resilient damping elements disposed near the respective ends of the central sleeve and between the central sleeve and the housing, the rotor having a hub with a circular cylindrical portion which is disposed within and end of the passage in the housing with a clearance between it and the wall of the portion of the passage through the housing in which it is disposed, annular seats at the opposite ends of the central sleeve receiving the resilient damping elements, the portion of the bore in the central sleeve disposed at the end thereof adjacent to the rotor having a diameter which is the same as the outer diameter of the double-row rolling bearing, the resilient damping elements each having an annular radially inner part and an annular radially outer part, there being an annular radially resilient intermediate part disposed between and bonded to the inner and outer parts of the resilient elements, the resilient damping means being provided with transverse shoulders which abut the end walls of the respective seats in the central sleeve, the housing having end orifices, said shoulders having their diameters reduced by the height of a limiting gap between them and the diameter of the end orifices of the housing of the spinning mechanism.

2. A resilient support for the rotor shaft of a high-speed rotor in accordance with claim 1, wherein the housing has an internal space therewithin which is connected to another space created between the axial end of the hub of the rotor and the row of the double-row rolling bearing which lies closer thereto by means of orifices which are disposed at an oblique angle with respect to the end of the central sleeve which lies closer to the rotor.

3. A resilient support for the rotor shaft of a high-speed rotor in accordance with claim 1, wherein air-passing openings are provided through the wall of the housing, said openings being provided with perforated shields, the rotor shaft has a driving end remote from the rotor, and at the end of the housing near the driving end of the rotor shaft there is provided a cut-out at one side of the housing, there being a resilient insert disposed in said cut-out in the housing.

* * * * *